United States Patent
Cao (10) Patent No.: US 11,183,928 B2
(45) Date of Patent: Nov. 23, 2021

(54) SWITCHING REGULATOR AND CONTROL METHOD THEREOF

(71) Applicant: Hua Cao, Leander, TX (US)

(72) Inventor: Hua Cao, Leander, TX (US)

(*) Notice: Subject to any disclaimer, the term of this patent is extended or adjusted under 35 U.S.C. 154(b) by 0 days.

(21) Appl. No.: 14/978,999

(22) Filed: Dec. 22, 2015

(65) Prior Publication Data
US 2016/0204704 A1  Jul. 14, 2016

Related U.S. Application Data (60) Provisional application No. 62/125,069, filed on Jan. 12, 2015, provisional application No. 62/125,213, filed on Jan. 16, 2015, provisional application No. 62/176,429, filed on Feb. 18, 2015.

(51) Int. Cl.
*H02M 3/158* (2006.01)
*H02M 3/156* (2006.01)

(52) U.S. Cl.
CPC .......... *H02M 3/156* (2013.01); *H02M 3/1566* (2021.05)

(58) Field of Classification Search
CPC .... H02M 3/156; H02M 3/158; H02M 3/1588; H02M 3/1584; Y02B 70/1466
USPC .......................................................... 323/282
See application file for complete search history.

(56) References Cited

U.S. PATENT DOCUMENTS

| | | | | |
|---|---|---|---|---|
| 4,730,242 A * | 3/1988 | Divan | ................. | H02M 7/4826 363/37 |
| 6,366,070 B1 * | 4/2002 | Cooke | ................. | H02M 3/1588 323/284 |
| 7,482,791 B2 * | 1/2009 | Stoichita | ............... | H02M 3/156 323/271 |
| 7,560,917 B2 * | 7/2009 | Ho | ........................ | H02M 3/158 323/285 |
| 2003/0006650 A1 * | 1/2003 | Tang | ........................ | G06F 1/26 307/43 |
| 2004/0085789 A1 * | 5/2004 | Lipcsei | ................. | H02M 3/156 363/127 |
| 2006/0049815 A1 * | 3/2006 | Ho | ........................ | H02M 3/158 323/282 |

(Continued)

*Primary Examiner* — Shawki S Ismail
*Assistant Examiner* — Monica Mata (57) ABSTRACT

A novel method to operate a switching regulator is presented. The method includes the generation of at least two reference signals. A first reference signal is a constant DC voltage signal and a second reference signal is a periodic ramp sawtooth signal at a given frequency. It also includes the generation of a feedback signal by using the output voltage of the switching regulator. In one method, a capacitor is either charged by a bias current or discharged by a switch. A first comparator is configured to compare a first constant DC reference voltage signal to a feedback signal. A second comparator is configured to compare a periodic ramp sawtooth signal to a voltage signal on the capacitor. In an alternative method, a comparator is configured to compare the feedback signal to either the periodic ramp sawtooth reference signal or the constant DC reference signal depending on the switching operation of the switching regulator. The periodic ramp sawtooth reference signal can be either positive or negative. The method is presented for buck switching regulators, and can be utilized also for boost, buck-boost, flyback, forward, and sepic, etc.

9 Claims, 10 Drawing Sheets

(56) References Cited

U.S. PATENT DOCUMENTS

| | | | | |
|---|---|---|---|---|
| 2009/0278516 A1* | 11/2009 | Bhagwat | ............. | H02M 3/1588 323/270 |
| 2013/0057239 A1* | 3/2013 | Kalje | .................. | H02M 3/1584 323/271 |
| 2013/0249511 A1* | 9/2013 | Kalje | ........................ | G05F 1/10 323/271 |
| 2014/0292299 A1* | 10/2014 | Yang | ................... | H02M 3/1588 323/288 |
| 2015/0002123 A1* | 1/2015 | Makigawa | .............. | H02M 1/36 323/284 |
| 2015/0022171 A1* | 1/2015 | Chen | .................... | H02M 3/158 323/282 |

* cited by examiner

SWITCHING REGULATOR AND CONTROL METHOD THEREOF

CROSS-REFERENCE TO RELATED APPLICATIONS

Prior Application Status: Pending
Continuity Type: Claims benefit of provisional
Prior Application Number: U.S. 62/125,069
Filing date: 2015-01-12 (YYYY-MM-DD)
Prior Application Status: Pending
Continuity Type: Claims benefit of provisional
Prior Application Number: U.S. 62/125,213
Filing date: 2015-01-16 (YYYY-MM-DD)
Prior Application Status: Pending
Continuity Type: Claims benefit of provisional
Prior Application Number: U.S. 62/176,429
Filing date: 2015-02-18 (YYYY-MM-DD)

BACKGROUND OF THE INVENTION

The invention relates to DC-DC converters or switching regulators.

The invention also relates to multiple-phase DC-DC converters or multiple-phase switching regulators.

DC-DC converters or switching regulators operate to convert energy from one DC voltage level to another DC voltage level. DC-DC converters or switching regulators, sometimes referred to as switching mode power supply, are used to convert an input supply voltage to a desired output voltage. Switching regulators provide power supply function through low loss components such as capacitors, inductors, transformers, and power switches that are turned on and off to transfer energy from the input to the output in discrete packets. Feedback control circuits are used to regulate the energy transfer to maintain a constant output voltage.

A switching regulator can be configured to step up the input voltage or to step down the input voltage or both. Specifically, a buck switching regulator, which is also called a buck converter, steps down the input voltage. A boost switching regulator, which is also called a boost converter, steps up the input voltage. A buck-boost switching regulator, or buck-boost converter, provides both step-up and step-down functions.

The operation of a typical buck switching regulator is well known and is generalized as follows. A power switch connected to the input power supply is turned on to provide energy to an inductor of the output filter circuit and thus allow the current through the inductor to build up. When the power switch connected to the input power supply is turned off and a second power switch connected to ground is turned on, the voltage across the inductor reverses. A relatively constant output voltage is maintained. The energy from the input power supply is stored on the inductor and capacitor through these two power switches and then transferred to the load.

The typical switching regulator has two operation modes: continuous conduction mode (CCM) and discontinuous conduction mode (DCM) depending on the load current. When the load is significant, the inductor current remains positive during the whole switching period and the switching regulator is in CCM mode. When the load current is very small, in order to maintain high efficiency, the switching regulator needs to lower the switching frequency and to reduce the current consumption in DCM mode.

In modern switching regulator or DC-DC converter design, one of the challenging tasks is to keep the output voltage change as small as possible when the load current is abruptly switched between very light load condition and very heavy load condition. When it happens, the converter should provide minimum overshoot and undershoot and a fast transient response.

BRIEF SUMMARY OF THE INVENTION

It is therefore an objective of the present invention to describe a switching regulator that has fast transient response.

It is another objective of the present invention to describe a multiple-phase switching regulators.

In a buck switching regulator, according to the present invention, there are two voltage comparators. A first voltage comparator receives a DC reference voltage signal and a feedback signal. A feedback signal is generated using the switching regulator output voltage and the inductor current. A second voltage comparator receives a periodic ramp sawtooth signal and a voltage signal on a capacitor. The capacitor is either charged by a bias current or discharged to ground by a switch. The output signals of the two voltage comparators are coupled to a logic and driver block to control the switching operations of a high-side power switch and a low-side power switch.

In an alternative embodiment of a buck switching regulator, according to the present invention, at least one comparator is configured to compare the feedback signal to either the periodic ramp sawtooth reference signal or the constant DC reference signal depending on the switching operation of the switching regulator. In this method, the periodic ramp sawtooth reference signal can be either positive or negative.

It is understood that other embodiments of the present invention will become readily apparent to those skilled in the art from the following detailed description, wherein it is shown and described only various embodiments of the invention by way of illustration. This novel regulator architecture can be used in all the switching power regulators, such as boost, buck-boost, flyback, forward, sepic, etc. As will be realized, the present invention is capable of other and different embodiments, and its several details are capable of modifications in various obvious respects, all without departing from the present invention. Accordingly, the drawings and description are to be regarded as illustrative in nature, and not as restrictive.

BRIEF DESCRIPTION OF DRAWINGS

The foregoing and a better understanding of the present invention will become apparent from the following detailed description of example embodiments and the claims when read in connection with the accompanying drawings, all forming a part of the disclosure of this invention. In the drawings, like reference numbers generally indicate identical, functionally similar, and/or structurally similar elements. While the foregoing and following written and illustrated disclosure focuses on disclosing example embodiments of the invention, it should be understood that the same is by way of illustration and example only and the invention is not limited thereto. The following represents brief descriptions of the drawings, wherein:

DETAILED DESCRIPTION OF THE INVENTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

The detailed description set forth below in connection with the appended drawings is intended as a description of exemplary embodiments of the present invention and is not intended to represent the only embodiments in which the present invention can be practiced. The term "exemplary" means "serving as an example, instance, or illustration," and should not necessarily be construed as preferred or advantageous over other embodiments. The detailed description includes specific details for the purpose of providing a thorough understanding of the present invention. However, it will be apparent to those skilled in the art that the present invention may be practiced without these specific details. In some instances, well-known structures and devices are shown in block diagram form in order to avoid obscuring the concepts of the present invention. These structures and devices, as well as other blocks, modules, and circuits may be "coupled" together to perform various functions. The term "coupled" means either a direct connection, or where appropriate, an indirect connection.

Figure 1:
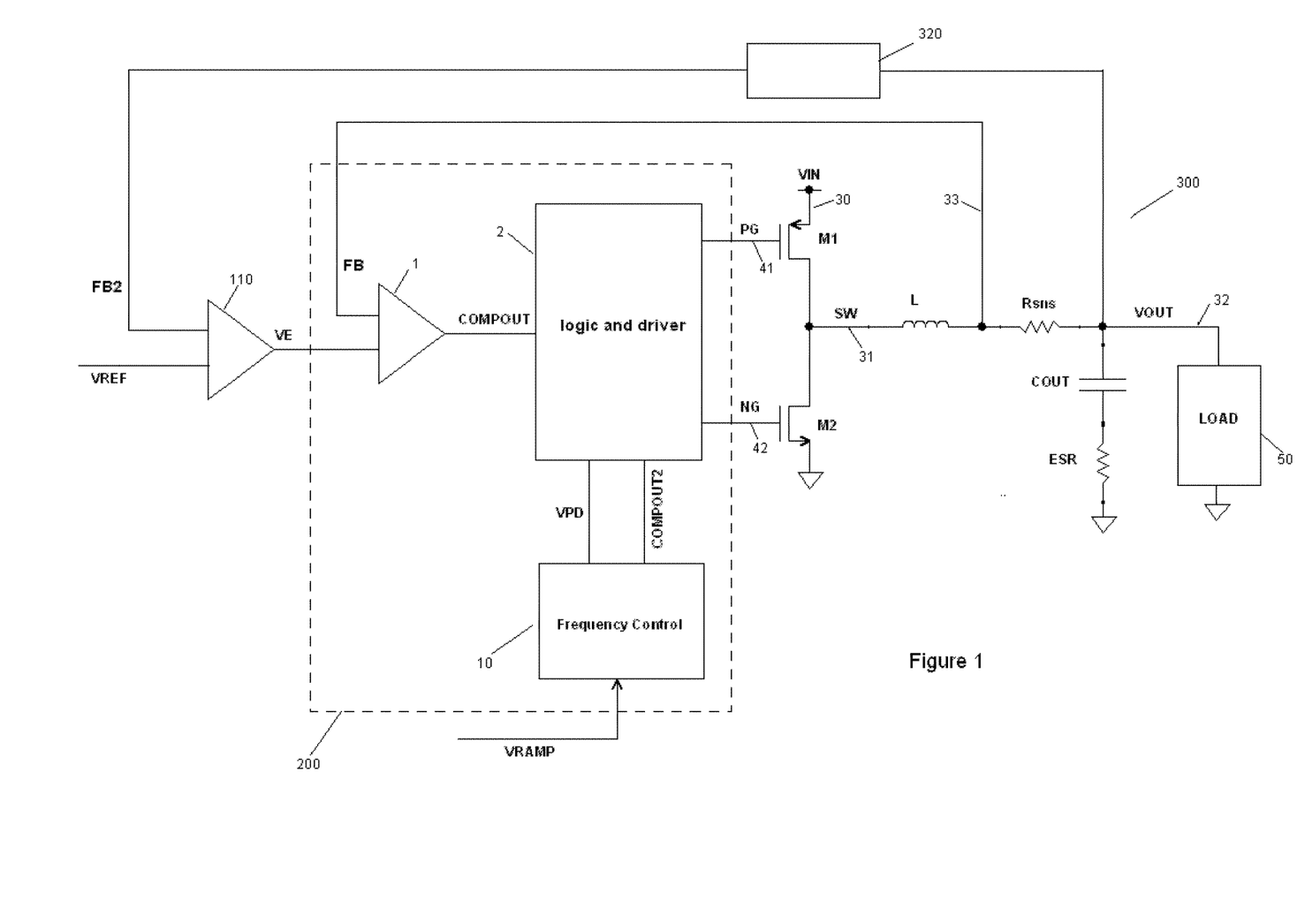
FIG. 1 is a schematic diagram of a switching regulator according to a first embodiment of the present invention.

FIG. 1 is a schematic diagram illustrating an embodiment of a buck switching regulator according to the present invention. A switching regulator 300 in FIG. 1 is shown as a buck switching regulator. However, the various concepts described throughout this disclosure may be extended to other switching regulators, such as boost, buck-boost, flyback, forward, sepic, etc. as well as other suitable applications. Also, the control method can be used for both synchronous and nonsynchronous switching regulators. Referring to FIG. 1, a switching regulator 300 includes a voltage amplifier 110, a voltage divider 320, a switching regulator controller 200 and two power switches M1 and M2. The FB and FB2 signals are two feedback signals generated from the output voltage VOUT. The power switch M1 is coupled between the input voltage VIN at node 30 and a switching node SW at node 31. The power switch M2 is coupled between ground and switching node SW. The gates of M1 and M2 are coupled to the logic and driver circuit 2 in the switching regulator controller 200. The switching node SW is coupled to output LRC filter circuit including an output inductor L and an output capacitor COUT with an equivalent series resistance (ESR), and a current sense resistor Rsns. The current sense resistor Rsns is connected between inductor L and the output capacitor COUT. The voltage divider 320 receives the VOUT signal and generates the feedback signal FB2. The voltage level of the FB2 signal is proportional to the voltage level of the VOUT signal. The voltage amplifier 110 senses the feedback signal FB2 and the reference voltage VREF to generate an error voltage signal VE. The VE signal is indicative of the voltage difference between the feedback signal FB2 and the reference voltage VREF.

Referring to FIG. 1, a switching regulator controller 200 includes a voltage comparator 1, a frequency control circuit 10 and a logic and driver circuit 2. The controller 200 is coupled to two power switches M1 and M2. The power switch M1 is also referred as a high-side power switch. The power switch M2 is also referred as a low-side power switch. In FIG. 1, the power switch M1 is a PMOS FET transistor and the power switch M2 is a NMOS FET transistor. In some other applications, the power switch M1 could be a NMOS transistor. The power switches M1 and M2 are connected in series between an input voltage VIN (node 30) and a ground potential. The power switches M1 and M2 are alternately turned on and off to generate a switching output signal SW at node 31. The switching operation of M1 and M2 are controlled by the output signals of the logic and driver circuit 2. The signal PG is an output signal of the logic and driver circuit 2 and it controls power switch M1 at node 41. The signal NG is another output signal of the logic and driver circuit 2 and it controls power switch M2 at node 42. The signal SW is directly coupled to LRC filter circuit including an output inductor L, a current sense resistor Rsns and an output capacitor COUT to generate a regulated output voltage VOUT at node 32 with a substantially constant voltage level. The output capacitor COUT further includes an equivalent series resistance ESR. The output voltage VOUT can be used to drive a load 50 whereby switching regulator 300 provides current to maintain the output voltage VOUT at a constant voltage level.

Referring to FIG. 1, VREF is one of the input signals of the switching converter 300 and VREF is a constant DC voltage signal. VRAMP is another input signal of the switching regulator controller 200 and VRAMP is a periodic negative ramp sawtooth signal. VRAMP is coupled to the frequency control circuit 10. The feedback signal FB is another input signal of the switching regulator controller 200. The FB signal can be generated by combining the output voltage VOUT and the inductor current IL. The FB signal can also be generated by combining the output voltage VOUT and the switching signal SW. The FB signal has triangle waveform and is in phase with the inductor current IL.

The feedback signal FB can be generated in various feedback ripple generation circuits. The feedback ripple generation circuit shown in FIG. 1 is only one of them and it can have many alternatives. The feedback ripple generation circuit normally includes current sense circuit which can sense the inductor current either in a direct or an indirect way. FIG. 1 shows a direct way to sense the inductor current. In FIG. 1, the resistor Rsns is connected in series with inductor L between node 33 and node 32 to sense directly the current flowing through the inductor L. The signal at node 33 is the feedback signal FB. The current flowing through inductor L generates ripple signal on the sense resistor Rsns. The voltage on the sense resistor Rsns is proportional to the inductor current and in phase with the inductor current.

The voltage comparator 1 in FIG. 1 receives the feedback signal FB and the VE signal and then generates output signal COMPOUT. The COMPOUT signal is coupled to the logic and driver circuit 2. The frequency control circuit 10 has the first input signal VRAMP and the second input signal VPD generated from the logic and driver circuit 2, respectively. The frequency control circuit 10 generates output signal COMPOUT2. The COMPOUT2 signal is coupled to the logic and driver circuit 2.

Figure 2:
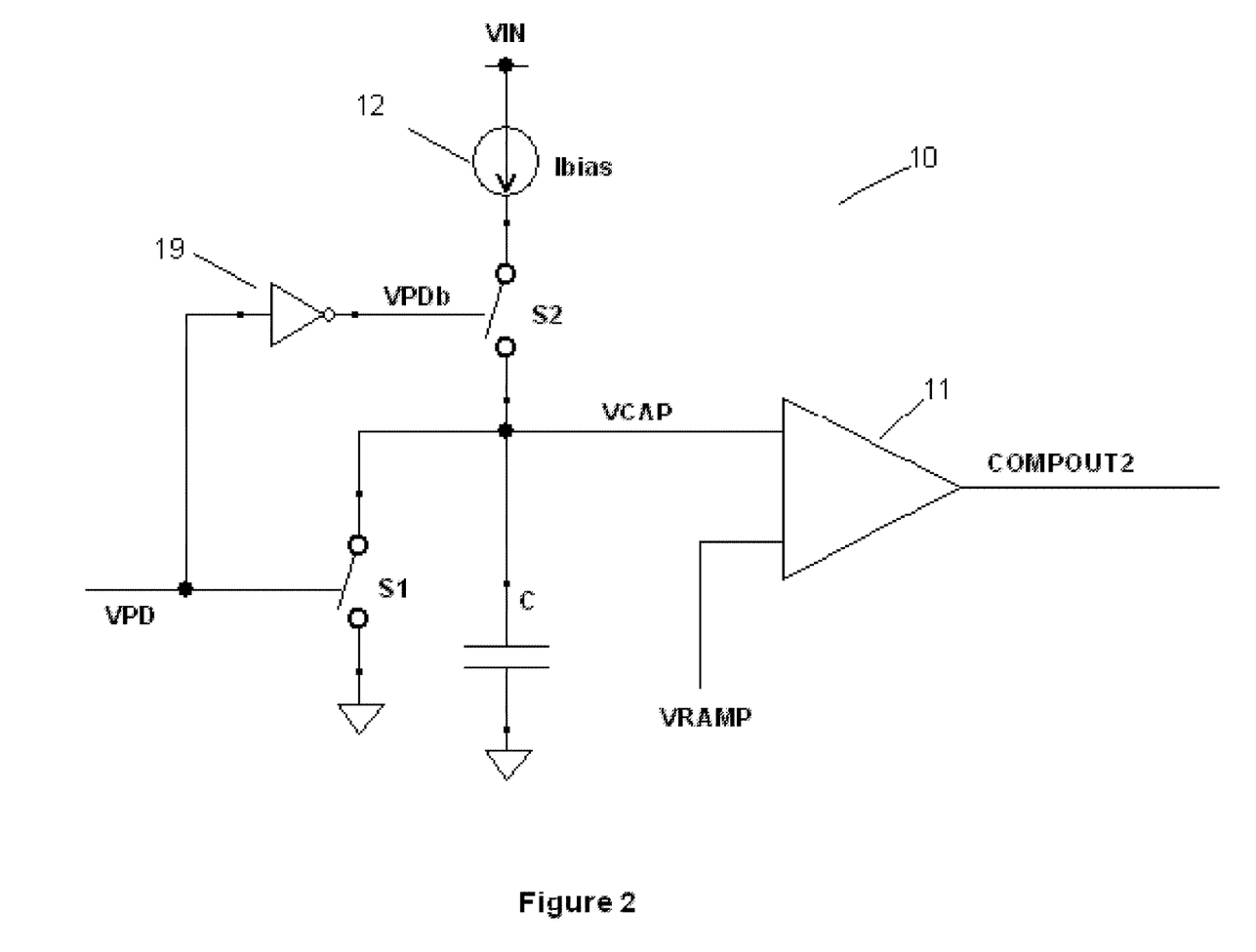
FIG. 2 is a schematic diagram of the frequency control circuit in FIG. 1.

FIG. 2 is a schematic diagram of frequency control circuit 10 indicated in FIG. 1. The frequency control circuit 10 includes a voltage comparator 11, a capacitor C, a bias current 12, an inverter 19, a switch S1 and a switch S2. The voltage signal on the capacitor C is VCAP. The control signal of the switch S1 is VPD signal and the control signal of the switch S2 is VPDb signal. The inverter 19 receives VPD signal and generate VPDb SIGNAL. VPD and VPDb are logic signals and they have opposite polarity. When VPD signal is in the logic high state, VPDb signal is in the logic low state; when VPD signal is in the logic low state, VPDb signal is in the logic high state. When VPD signal is in the logic high state, the switch S1 is turned on and the switch S2 is turned off, the capacitor C is discharged through the switch S1 and VCAP signal is pulled down to 0V. When VPD is in the logic low state, the switch S1 is turned off and the switch S2 is turned on, the capacitor C is charged by the bias current 12 with a charging current Ibias and VCAP signal ramps up. The voltage comparator 11 has two input terminals. VCAP is coupled to the first input terminal of the comparator 11. The VRAMP signal is coupled to the second input terminal of the comparator 11. The VRAMP signal is a periodic negative ramp sawtooth signal. The comparator 11 compares the signal VCAP to the signal VRAMP and generates output signal COMPOUT2 based on the comparison. The COMPOUT2 signal is coupled to the logic and driver 2 in FIG. 1. The logic and driver signal 2 receives the COMPOUT signal from the comparator 1 and COMPOUT2 signal from the comparator 11, respectively. It generates the PG signal and NG signal to control the switching operation of the power switch M1 and M2.

The VREF signal is a constant DC voltage signal. The VRAMP signal is a periodic negative ramp sawtooth signal. The period of VRAMP signal is Ts and the frequency of VRAMP signal is 1/Ts. The positive-going slope is extremely steep. The falling time from the peak value of VRAMP to the valley value of VRAMP is much larger than the rising time from the valley value of VRAMP to the peak value of VRAMP. In an alternative embodiment, the VRAMP signal can be a periodic positive ramp sawtooth signal when the capacitor C is discharged or charged in an alternative order.

According to an embodiment in FIG. 1 of the present invention, the comparator 1 compares the VE signal to the peak of the feedback signal FB. When the feedback signal FB reaches above the VE signal, the voltage comparator 1 changes COMPOUT logic state. The logic and driver circuit 2 receives COMPOUT signal, turns off the power switch M1, turn on the power switch M2 and sets VPD signal low. The inductor current ramps down with a negative slope approximately equal to (−VOUT)/L. The power switch M1 maintains off and the power switch M2 maintains on so long as the voltage comparator 11 changes COMPOUT2 logic state. The logic low signal VPD turns off the switch S1 and turns on the switch S2 in the frequency control circuit 10. The capacitor C is charged by the bias current 12 and thus the VCAP signal ramps up from 0V. When VCAP signal reaches above VRAMP, the voltage comparator 11 changes COMPOUT2 logic state. The logic and driver circuit 2 receives COMPOUT2 signal, turn of the power switch M2, turn on the power switch M1, and sets VPD signal high. The inductor current ramps up with a positive slope approximately equal to (VIN−VOUT)/L. The power switch M2 maintains off and the power switch M1 maintains on so long as the voltage comparator 1 changes COMPOUT logic state. The logic high signal VPD turns on the switch S1 and turns off the switch S2. The capacitor C is discharged through switch S1. The VCAP signal is pulled down to 0V. Since the resistor Rsns in FIG. 1 directly senses the inductor current, the voltage on resistor Rsns is proportional to the inductor current IL and also in phase with inductor current IL. The feedback signal FB is the output voltage VOUT plus the voltage drop on Rsns. The feedback signal FB is in phase with inductor current IL.

Referring to FIG. 1 and FIG. 2, the voltage comparator 1 compares VE signal to FB signal. It generates the COMPOUT signal and controls when to turn off the power switch M1 and turn on the power switch M2. The voltage comparator 11 compares the VCAP signal to VRAMP signal and generates COMPOUT2 signal and controls when to turn off the power switch M2 and turn on the power switch M1. The switching operations of the power switch M1 and M2 only depend on the trigger points of the voltage comparator 1 and comparator 11.

Referring to FIG. 1 and FIG. 2, according to another embodiment of the present invention, the comparator 1 compares the VE signal to the valley of the feedback signal FB. When the feedback signal FB reaches below the VE signal, the voltage comparator 1 changes COMPOUT logic state. The logic and driver circuit 2 receives COMPOUT signal, turns off the power switch M2, turns on the power switch M1, and sets VPD signal low. The inductor current ramps up with a positive slope approximately equal to (VIN−VOUT)/L. The power switch M2 maintains off and the power switch M1 maintains on so long as the voltage comparator 11 changes COMPOUT2 logic state. The logic low signal VPD turns off the switch S1 and turns on the switch S2 in the frequency control circuit 10. The capacitor C is charged by the bias current 12 so the VCAP signal ramps up from 0V. When VCAP signal reaches above VRAMP, the voltage comparator 11 changes COMPOUT2 logic state. The logic and driver circuit 2 receives COMPOUT2 signal, turns off the power switch M1, turns on the power switch M2 and sets VPD signal high. The inductor current ramps down with a negative slope approximately equal to (−VOUT)/L. The power switch M1 maintains off and the power switch M2 maintains on so long as the voltage comparator 1 changes COMPOUT logic state. The logic high signal VPD turns on the switch S1 and turns off the switch S2 in the frequency control circuit 10. The capacitor C is discharged through switch S1. The VCAP signal is pulled down to 0V. Since the resistor Rsns in FIG. 1 directly senses the inductor current, the voltage on resistor Rsns is proportional to the inductor current IL and also in phase with inductor current IL. The feedback signal FB is the output voltage VOUT plus the voltage drop on Rsns. The feedback signal FB is in phase with inductor current IL.

Figure 3:
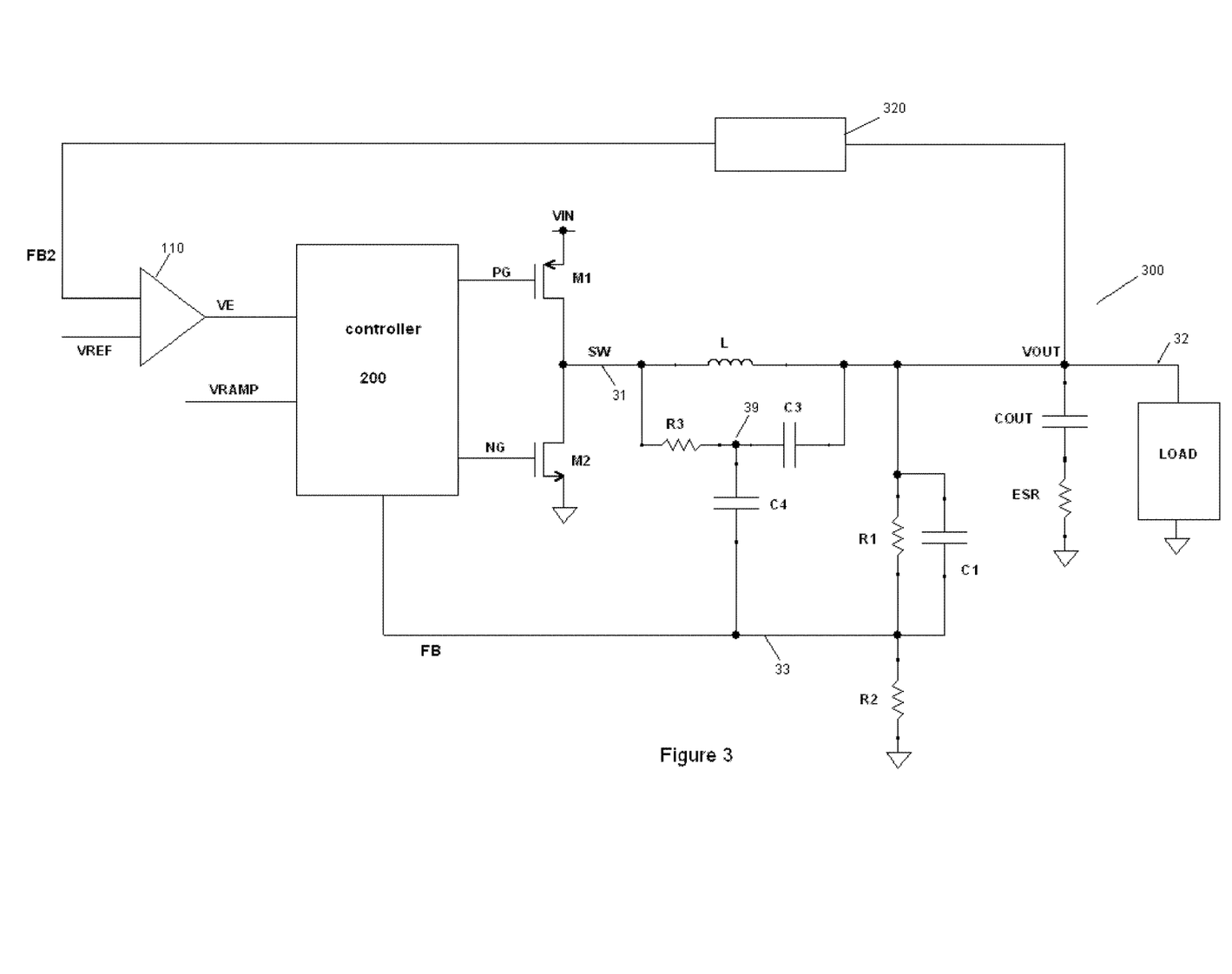
FIG. 3 is a schematic diagram of a switching regulator according to an alternative embodiment of the feedback generation method of FIG. 1 where the current sense resistor of FIG. 1 is replaced by a new RC network.

FIG. 3 is a schematic diagram of a switching regulator 300 according to another embodiment of the present invention where the feedback signal FB in FIG. 1 is generated by a new RC network. Referring to FIG. 3, the switching regulator 300 is similar to the switching regulator in FIG. 1.

It includes a voltage amplifier 110, a voltage divider 320, a switching regulator controller 200 and two power switches M1 and M2 coupled to the output LC filter circuit which includes an output inductor L and an output capacitor COUT with an equivalent series resistance (ESR). The FB and FB2 signals are two feedback signals generated from the output voltage VOUT. The voltage divider 320 receives the VOUT signal and generates the feedback signal FB2. The voltage level of the FB2 signal is proportional to the voltage level of the VOUT signal. The voltage amplifier 110 senses the feedback signal FB2 and the reference voltage VREF to generate an error voltage signal VE. The VE signal is indicative of the voltage difference between the feedback signal FB2 and the reference voltage VREF. The VE signal is coupled to the controller 200. FIG. 3 has a new RC network to generate the feedback signal FB. The feedback signal FB is coupled to the voltage comparator 1 in the controller 200 similar to FIG. 1. The new RC network includes R1, R2, C1, R3, C3 and C4. The resistors R1 and R2 are connected in series between the output voltage at node 32 and the ground potential. The signal at the common node 33 of R1 and R2 is the feedback signal FB which is coupled to the input terminal of the voltage comparator 1 in the controller 200. The capacitor C1 is connected in parallel with resistor R1 between node 32 and node 33. The resistor R2 is optional and may be omitted in other embodiments. The capacitor C1 is optional and may be omitted in other embodiments. The resistor R3 and capacitor C3 are connected in series across the inductor L between nodes 31 and node 32. The capacitor C4 connects to the common node 39 of resistor R3 and capacitor C3 and the feedback voltage signal FB at node 33. The feedback signal FB has approximately triangle waveform similar to the waveform of the inductor current IL and is in phase with the inductor current IL.

Figure 4:
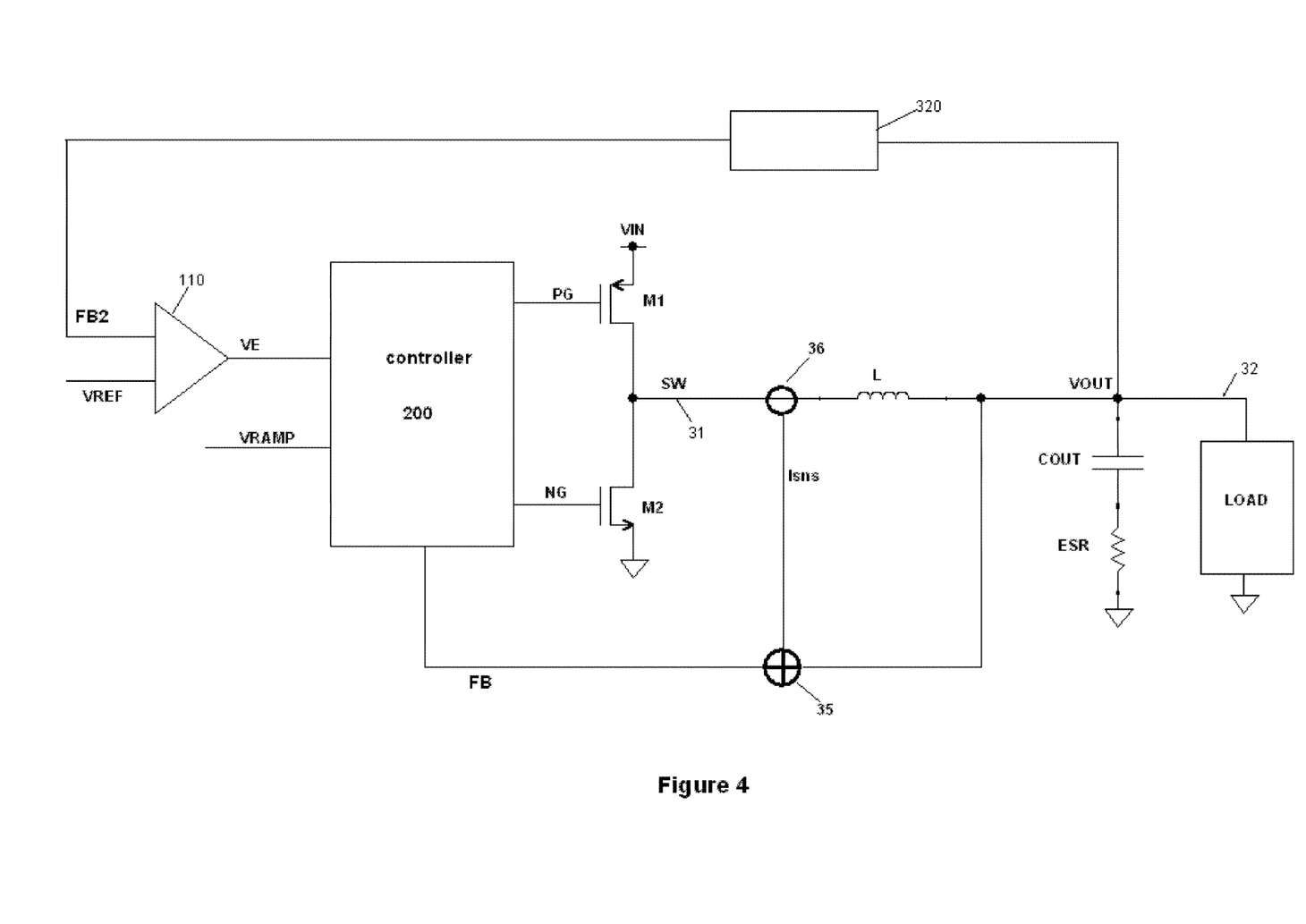
FIG. 4 is a schematic diagram of a switching regulator according to an alternative embodiment of the feedback generation method of FIG. 1 where the current sense resistor of FIG. 1 is replaced by a current sensing circuit.

FIG. 4 is a schematic diagram of a switching regulator 300 according to another embodiment of the present invention in FIG. 1. Referring to FIG. 4, the switching regulator 300 is similar to the switching regulator in FIG. 1. It includes a voltage amplifier 110, a voltage divider 320, a switching regulator controller 200 and two power switches M1 and M2 coupled to the output LC filter circuit which includes an output inductor L and an output capacitor COUT with an equivalent series resistance (ESR). The FB and FB2 signals are two feedback signals. The voltage divider 320 receives the VOUT signal and generates the feedback signal FB2. The voltage level of the FB2 signal is proportional to the voltage level of the VOUT signal. The voltage amplifier 110 senses the feedback signal FB2 and the reference voltage VREF to generate an error voltage signal VE. The VE signal is indicative of the voltage difference between the feedback signal FB2 and the reference voltage VREF. The VE signal is coupled to the controller 200. FIG. 4 includes a current sense circuit 36 and feedback generator 35. The current sense circuit 36 generates output signal Isns. The Isns signal is proportional to the inductor current IL and in phase with the inductor current IL. The feedback generator 35 receives the current sense signal Isns and the output voltage VOUT and generates the feedback signal FB. The feedback signal FB is in phase with the inductor current IL. The feedback signal FB is coupled to the voltage comparator 1 in the controller 200.

Figure 5:
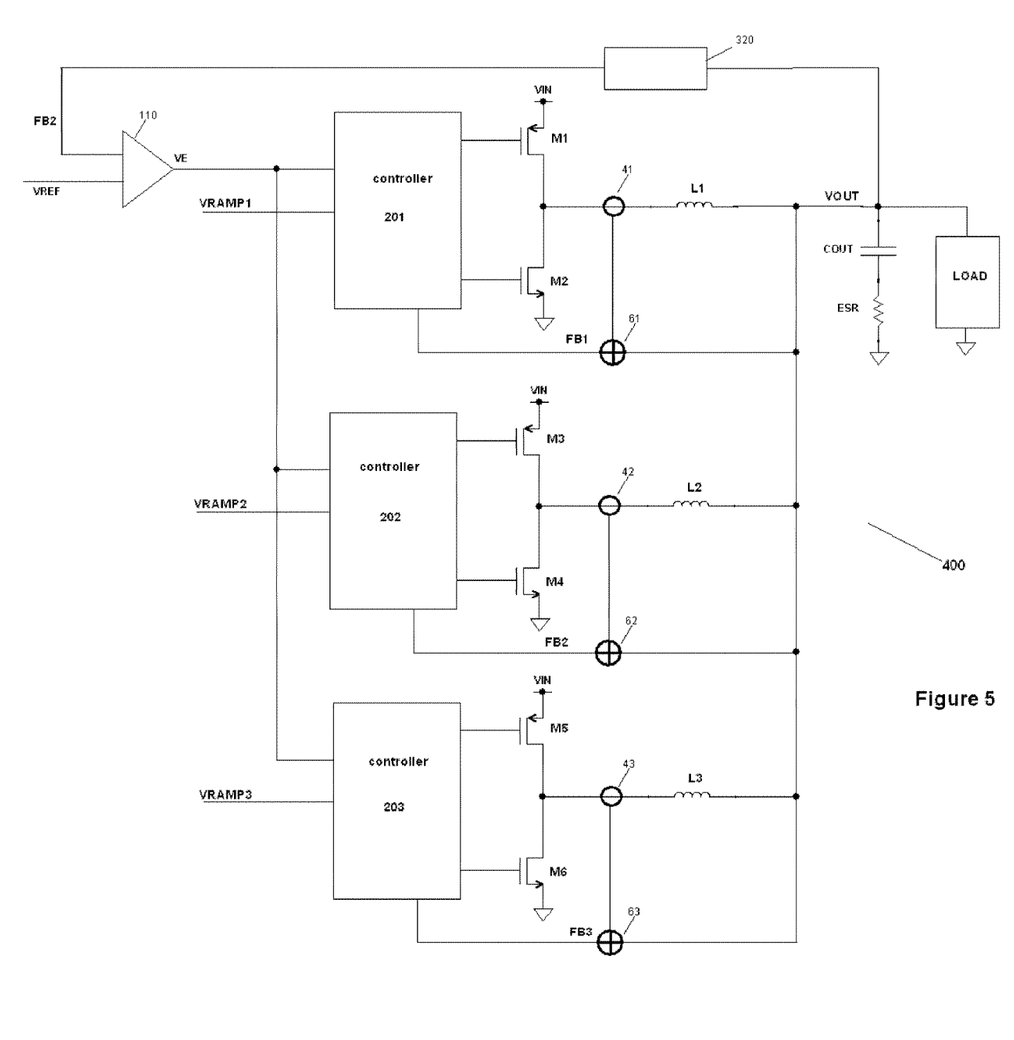
FIG. 5 is a schematic diagram of a multi-phase switching regulator according to a further embodiment of the present invention of FIG. 4.

The method in the present invention can be used for multiple-phase switching regulator. FIG. 5 is a schematic diagram of a 3-phase switching regulator 400 according to a further embodiment of the present invention of FIG. 4. Other switching regulators could have a different number of phases. The multiple-phase switching regulator shown in FIG. 5 is a buck multiple-phase switching regulator, but is not limited to this embodiment. The same principle, main blocks and system operation can also be made for the case of other multiple-phase switching regulator, for example boost multiple-phase switching regulator. Referring to FIG. 5, the 3-phase switching regulator 400 includes a voltage amplifier 110, a voltage divider 320, 3 switching regulator controllers 201, 202 and 203. The voltage divider 320 receives the VOUT signal and generates the feedback signal FB2. The voltage level of the FB2 signal is proportional to the voltage level of the VOUT signal. The voltage amplifier 110 senses the feedback signal FB2 and the reference voltage VREF to generate an error voltage signal VE. The VE signal is indicative of the voltage difference between the feedback signal FB2 and the reference voltage VREF. The VE signal is coupled to the 3 controllers. The 3 controllers are similar to the one in FIG. 4. The controller 201 controls the switching operation of the high-side power switch M1 and the low-side power switch M2. The power switches M1 and M2 are coupled to an inductor L1. The inductor L1 is coupled to an output capacitor COUT with an equivalent series resistance (ESR). The current sense circuit 41 generates a current sense signal which is proportional to the inductor current. The feedback generator 61 receives the current sense signal and the output voltage VOUT and generates the feedback signal FB1. The feedback signal FB1 is in phase with the inductor L1 current and is coupled to the controller 201. The error voltage signal VE is an input signal of the controller 201. VRAMP1 is another input signal of the controller 201. The controller 202 controls the switching operation of the high-side power switch M3 and the low-side power switch M4. The controller 202 controls the switching operation of the high-side power switch M3 and the low-side power switch M4. The power switches M3 and M4 are coupled to an inductor L2. The inductor L2 is coupled to an output capacitor COUT with an equivalent series resistance (ESR). The current sense circuit 42 generates a current sense signal which is proportional to the inductor current. The feedback generator 62 receives the current sense signal and the output voltage VOUT and generates the feedback signal FB2. The feedback signal FB2 is in phase with the inductor L2 current and is coupled to the controller 202. The error voltage signal VE is an input signal of the controller 202. VRAMP2 is another input signal of the controller 202. The controller 203 controls the switching operation of the high-side power switch M5 and the low-side power switch M6. The power switches M5 and M6 are coupled to an inductor L3. The inductor L3 is coupled to an output capacitor COUT with an equivalent series resistance (ESR). The current sense circuit 43 generates a current sense signal which is proportional to the inductor current. The feedback generator 63 receives the current sense signal and the output voltage VOUT and generates the feedback signal FB3. The feedback signal FB3 is in phase with the inductor L3 current and is coupled to the controller 203. The error voltage signal VE is an input signal of the controller 203. VRAMP3 is another input signal of the controller 203.

In FIG. 5, VRAMP1, VRAMP2, and VRAMP3 are periodic negative ramp sawtooth signals. They have the same period (Ts). The peak value of VRAMP1, VRAMP2, and VRAMP3 are same. The valley value of VRAMP1, VRAMP2, and VRAMP3 are same. The positive-going slope of VRAMP1, VRAMP2, and VRAMP3 is extremely steep. The falling time from the peak value of VRAMP1, VRAMP2, and VRAMP3 to the valley value of VRAMP1, VRAMP2, and VRAMP3 is much larger than the rising time from the valley value to the peak value. The phase shift between VRAMP1 and VRAMP2 is 120 degree. The phase shift between VRAMP2 and VRAMP3 is 120 degree. The phase shift between VRAMP3 and VRAMP1 is 120 degree. The time delay between VRAMP1 and VRAMP2 is Ts/3. The time delay between VRAMP2 and VRAMP3 is Ts/3. The time delay between VRAMP3 and VRAMP1 is Ts/3. The switching regulator 400 includes 3 phases. The switching frequency of each phase is 1/Ts. Other switching regulators could have different number of phases and the phase shift between the phases could be different. For example, in a 4-phase switching regulator, the phase shift between two adjacent phases is 90 degree.

In FIG. 5, an alternative feedback generation method can also be used to generate the feedback signals. For example, the feedback generation method in FIG. 1 or in FIG. 3 can be used to generate the feedback signals in a multiple-phase switching regulator.

Figure 6:
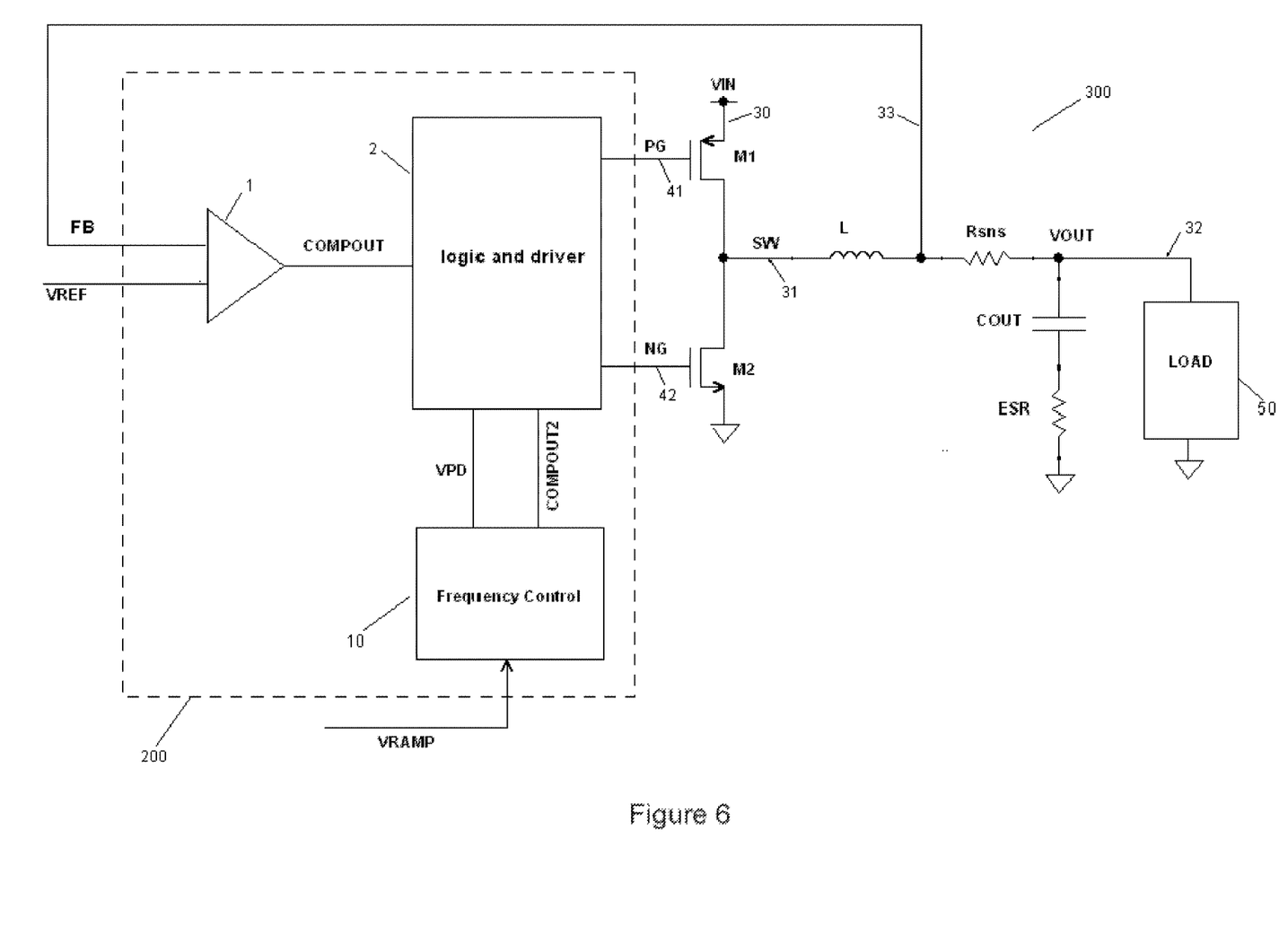
FIG. 6 is a schematic diagram of a switching regulator according to an alternative embodiment of the present invention of FIG. 1.

FIG. 6 is a schematic diagram illustrating an alternative embodiment of a buck switching regulator according to the present invention in FIG. 1. Referring to FIG. 6, a switching regulator 300 includes a switching regulator controller 200 and two power switches M1 and M2. The power switch M1 is coupled between the input voltage VIN at node 30 and a switching node SW at node 31. The power switch M2 is coupled between ground and switching node SW. The gates of M1 and M2 are coupled to the logic and driver circuit 2 in the switching regulator controller 200. The switching node SW is coupled to output LRC filter circuit including an output inductor L and an output capacitor COUT with an equivalent series resistance (ESR), and a current sense resistor Rsns. The current sense resistor Rsns is connected between inductor L and the output capacitor COUT. A switching regulator controller 200 includes a voltage comparator 1, a frequency control circuit 10 illustrated in FIG. 2 and a logic and driver circuit 2.

Referring to FIG. 6, the feedback signal FB can be generated by an alternative embodiment as illustrated in FIG. 3 or in FIG. 4.

Figure 7:
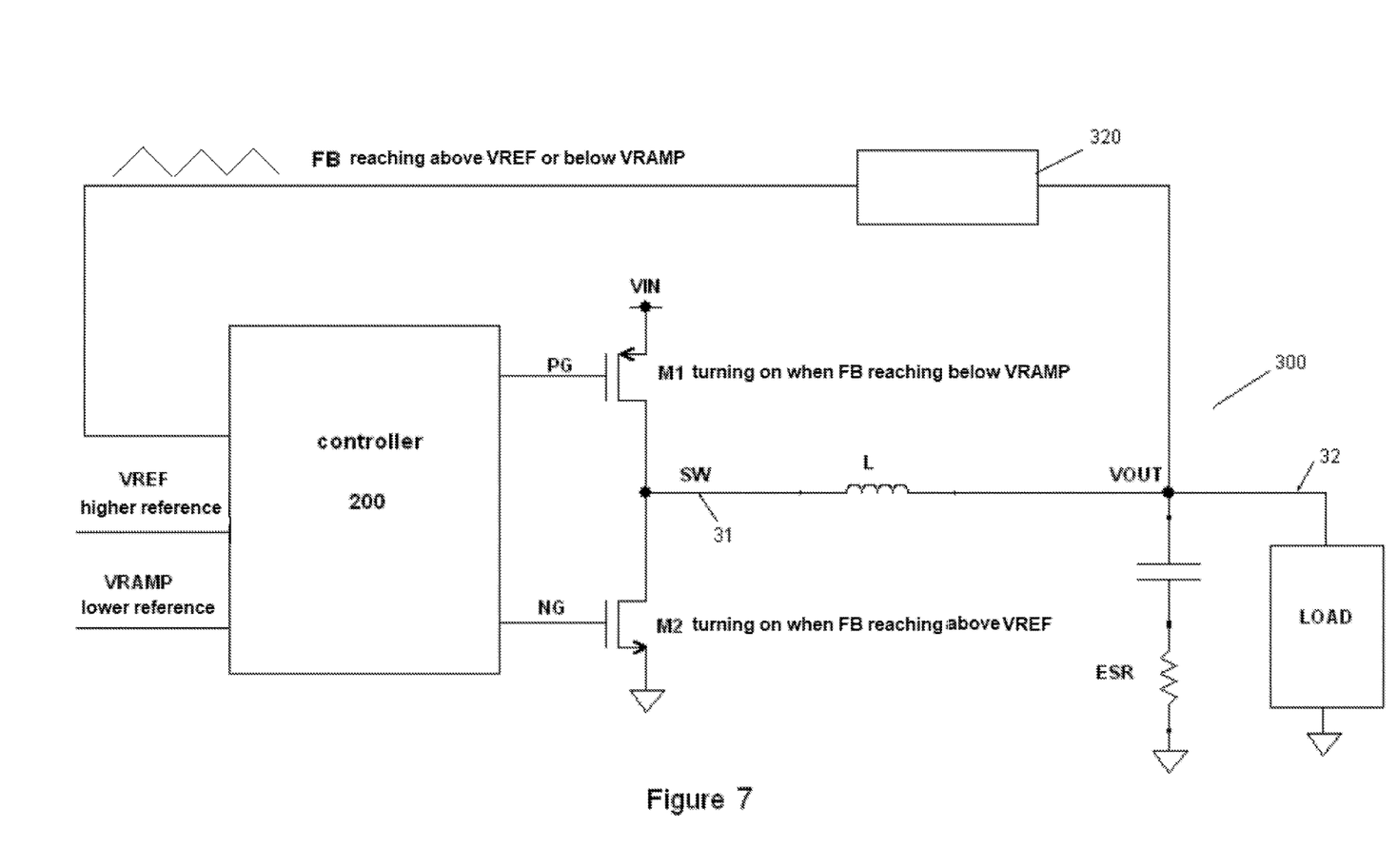
FIG. 7 an 9 are schematic diagrams of a switching regulator according to a second embodiment of the present invention.

FIG. 7 is a schematic diagram illustrating an alternative embodiment of a buck switching regulator according to the present invention. Referring to FIG. 7, a switching regulator 300 includes a controller 200 and two power switches M1 and M2. The power switch M1 is coupled between the input voltage VIN and a switching node SW at node 31. The power switch M2 is coupled between ground and switching node SW. The gates of M1 and M2 are coupled to a controller 200. The switching node SW is coupled to output LRC filter circuit including an output inductor L and an output capacitor COUT with an equivalent series resistance (ESR). The switching regulator controller 200 includes a signal selector 10, a voltage comparator 1, a logic and driver circuit 22. The reference signal generator 100 generates two output signals VREF and VRAMP; the signal VREF is a constant DC voltage signal. The signal VRAMP is a periodic positive ramp sawtooth signal. VREF is coupled to the first terminal of signal selector 10. VRAMP is coupled to the second terminal of signal selector 10. The signal selector 10 has the third input signal COMPOUT. COMPOUT signal is the output signal of voltage comparator 1. The signal selector 10 is used for selecting either VREF signal or VRAMP signal based on the logic state of COMPOUT signal when generating the output signal from VREF or VRAMP. The output signal is coupled to the positive input terminal of voltage comparator 1. When COMPOUT is logic high, the signal selector 10 selects VREF as the output signal of the signal selector 10; when COMPOUT is logic low, the signal selector 10 selects VRAMP as the output signal of the signal selector 10. The output signal of the signal selector 10 is coupled to the positive input of voltage comparator 1. The voltage comparator 1 has the second input signal FB. FB signal is coupled to the negative input terminal of voltage comparator 1. The feedback generator 320 receives the output voltage VOUT and generates feedback signal FB. The feedback signal is in phase with the inductor current and is coupled to controller 200. The signal VREF and VRAMP are the two reference signal of the controller 200. VREF signal is a DC voltage signal. VRAMP is either a periodic negative ramp sawtooth signal or a periodic positive ramp sawtooth signal. When the voltage level of VREF is larger than the voltage level of VRAMP signal (VREF is a higher reference signal and VRAMP is a lower reference signal), VRAMP is a periodic positive ramp sawtooth signal and its rising time is much larger than the falling time. When the voltage level of VREF signal is smaller than the voltage level of VRAMP signal (VREF is a lower reference signal and VRAMP is a higher reference signal), VRAMP is a periodic negative ramp sawtooth signal and its rising time is much smaller than the falling time. In a normal operation mode, when the feedback signal FB reaches below the lower reference signal, the controller turns off the low-side switch and turns on the high-side switch; in the meantime, the inductor current starts to ramp up. The high-side switch maintains on so long as the feedback signal FB reaches above the higher reference signal. When the feedback signal FB reaches above the higher reference signal, the controller turns off the high-side switch and turns on the low-side switch. In the meantime, the inductor current starts to ramp down. The low-side switch maintains on so long as the feedback signal FB reaches below the lower reference signal.

Figure 8:
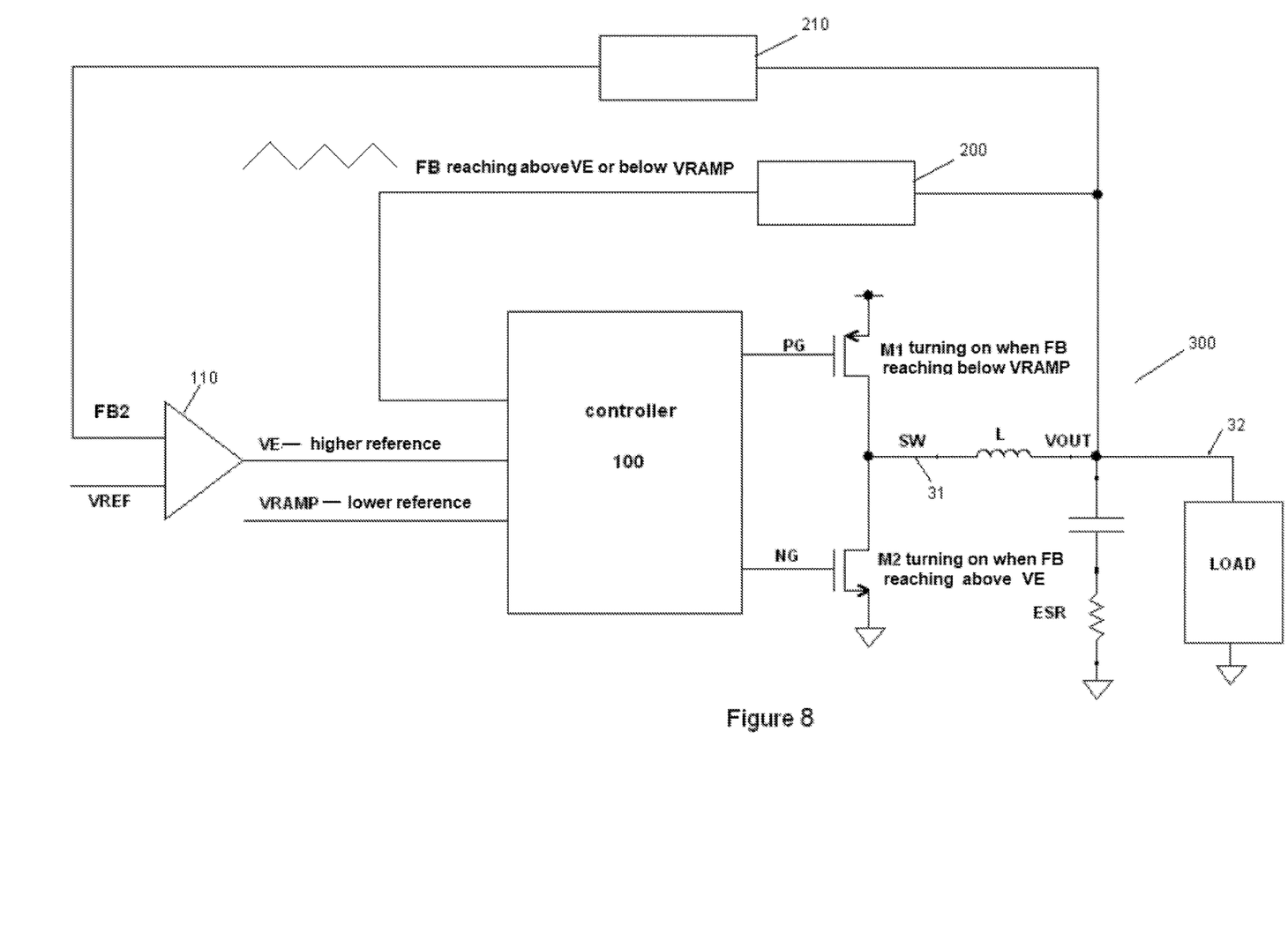
FIG. 8 an 10 are schematic diagrams of a switching regulator according to an alternative embodiment of FIG. 7 an 9.
Figure 9:
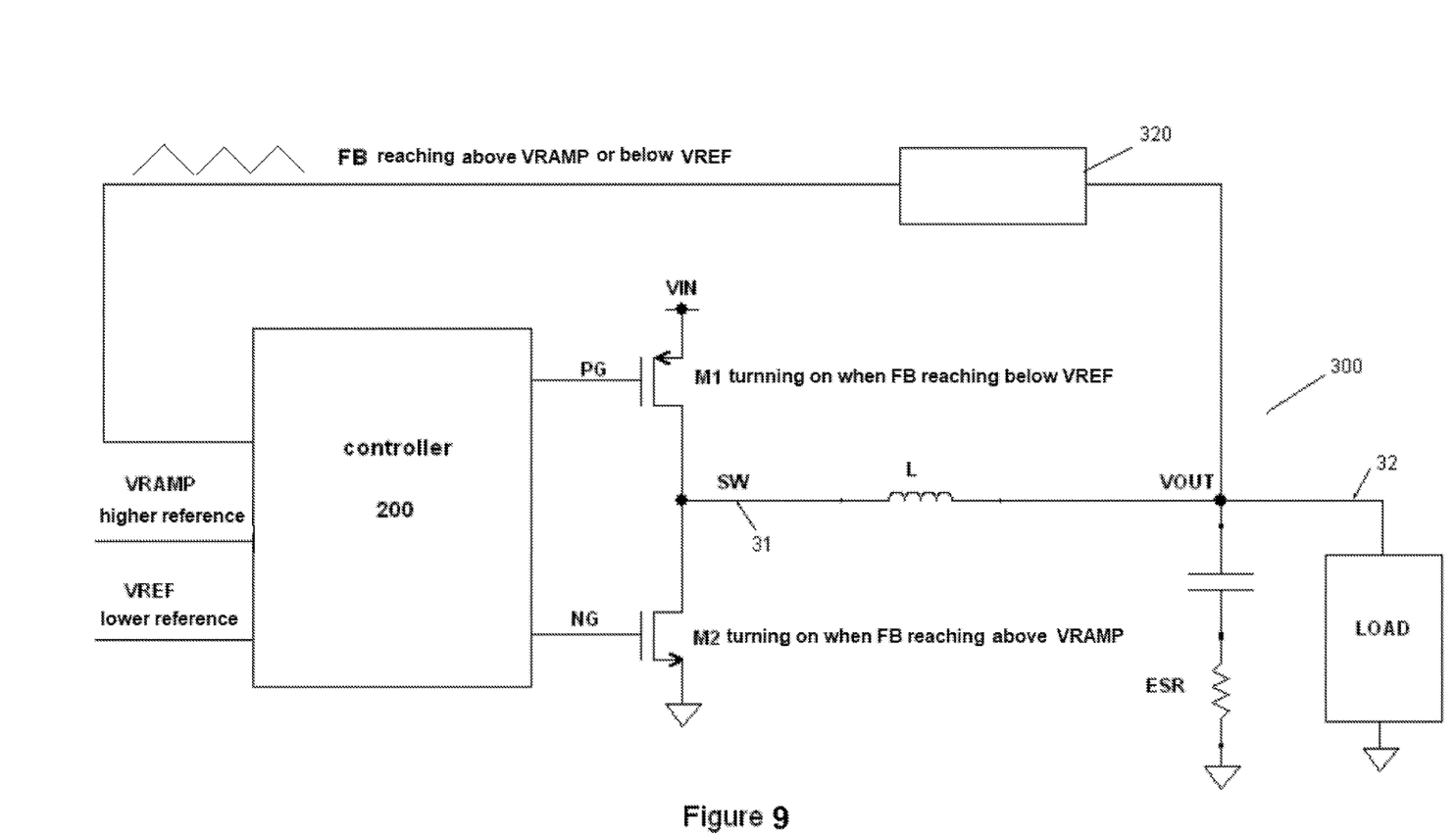
Figure 10:
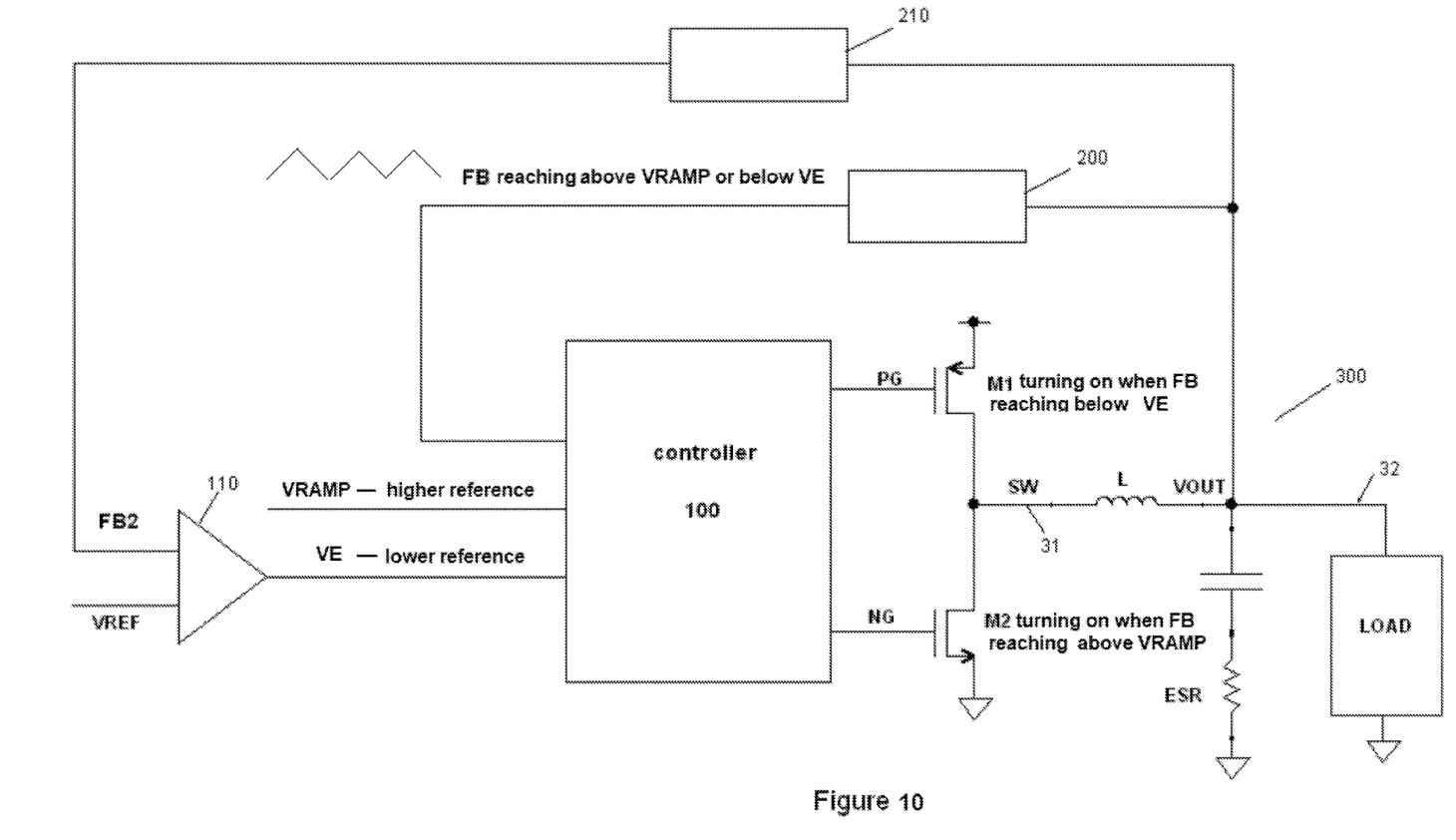

FIG. 8 an 10 are schematic diagrams illustrating an alternative embodiment of a buck switching regulator according to the present invention. Referring to FIGS. 8 and 10, the switching regulator 300 includes a voltage amplifier 110, a feedback generator 200, a voltage divider 210, a controller 100 and two power switches M1 and M2 coupled to the output LC filter circuit which includes an output inductor L and an output capacitor COUT with an equivalent series resistance (ESR). The FB and FB2 signals are two feedback signals generated from the output voltage VOUT. The voltage divider 210 receives the VOUT signal and generates the feedback signal FB2. The voltage level of the FB2 signal is proportional to the voltage level of the VOUT signal. The voltage amplifier 110 senses the feedback signal FB2 and the reference voltage VREF to generate an error voltage signal VE. The VE signal is indicative of the voltage difference between the feedback signal FB2 and the reference voltage VREF. The VE signal is coupled to the controller 100. The feedback generator 200 receives the output voltage VOUT and generates feedback signal FB. The feedback signal FB is in phase with the inductor current and is coupled to controller 100. The signal VE and VRAMP are the two reference signal of the controller 200. VE signal is a DC or slowly-changing voltage signal. VRAMP is either a periodic negative ramp sawtooth signal or a periodic positive ramp sawtooth signal. When the voltage level of VE signal is larger than the voltage level of VRAMP signal (VE is higher reference signal and VRAMP is lower reference signal), VRAMP is a periodic positive ramp sawtooth signal and its rising time is much larger than the falling time. When the voltage level of VE signal is smaller than the voltage level of VRAMP signal (VE is lower reference signal and VRAMP is higher reference signal), VRAMP is a periodic negative ramp sawtooth signal and its rising time is much smaller than the falling time. In a normal operation mode, when the feedback signal FB2 reaches below the lower reference signal, the controller 100 turns off the low-side switch and turns on the high-side switch; in the meantime, the inductor current starts to ramp up. The high-side switch maintains on so long as the feedback signal FB reaches above the higher reference signal. When the feedback signal FB reaches above the higher reference signal, the controller 100 turns off the high-side switch and turns on the low-side switch; in the meantime, the inductor current starts to ramp down. The low-side switch maintains on so long the feedback signal FB reaches below the lower reference signal.

It is understood that other embodiments of the present invention will become readily apparent to those skilled in the art from the following detailed description, wherein it is shown and described only various embodiments of the invention by way of illustration. The described embodiments in this present invention can be used in all the switching regulators, such as boost, buck-boost, flyback, forward, sepic, etc. As will be realized, the invention is capable of other and different embodiments and its several details are capable of modification in various other respects, all without departing from the spirit and scope of the present invention. Accordingly, the disclosed embodiments, drawings, and detailed description are to be merely regarded as illustrative in nature and not restrictive.

What is claimed is:

1. A switching regulator configured to receive an input voltage and to generate a regulated output voltage; and said switching regulator controlling a high-side power switch and a low-side power switch based on a feedback control scheme to drive a switching node for generating a switching output voltage; and said switching node being coupled to an LC filter to generate said regulated output voltage on an output capacitor; and said switching regulator comprising:
   a constant voltage reference signal;
   a periodic ramp sawtooth reference signal at a given frequency;
   wherein said periodic ramp sawtooth reference signal not being generated from said switching output voltage;
   a feedback generation circuit configured to generate a first feedback signal; wherein said first feedback signal being in phase with an inductor current; wherein said first feedback signal being generated through sensing said inductor current;
   a controller configured to receive said first feedback signal and said periodic ramp sawtooth reference signal and a voltage amplifier output signal;
   wherein said controller comprising a first comparator; wherein comparing signals of said first comparator consisting of said first feedback signal and said voltage amplifier output signal;
   wherein said controller further comprising a capacitor;
   wherein said controller further comprising a first switch; wherein said capacitor being discharged through turning on said first switch;
   wherein said controller further comprising a second switch: wherein said capacitor being charged through a bias current by turning on said second switch thereby generating a voltage signal on said capacitor;
   wherein said controller further comprising a second comparator configured to compare said periodic ramp sawtooth reference signal and said voltage signal on said capacitor and to generate a second comparator output signal;
   wherein a logic and driver circuit configured to directly receive said first comparator output signal and to directly receive said second comparator output signal and to generate control signals of said high-side power switch and said low-side power switch.

2. Said switching regulator in claim 1, further comprising a plurality of said switching regulator circuits; wherein said plurality of said switching regulator circuits configured to be a multi-phase switching regulator.

3. Said switching regulator in claim 1 being a switching regulator belonging to a group comprising buck, boost, buck-boost, flyback, forward and sepic switching regulator.

4. A switching regulator configured to receive an input voltage and to generate a regulated output voltage; and said switching regulator controlling a high-side power switch and a low-side power switch based on a feedback control scheme to drive a switching node for generating a switching output voltage; and said switching node being coupled to an LC filter to generate said regulated output voltage on an output capacitor; and said switching regulator comprising:
   a constant voltage reference signal;
   a periodic ramp sawtooth reference signal at a given frequency; wherein said periodic ramp sawtooth reference signal not being generated from said switching output voltage;
   a feedback generation circuit configured to generate a first feedback signal; wherein said first feedback signal being in phase with an inductor current; wherein said first feedback signal being generated through sensing said inductor current;
   a controller configured to receive said first feedback signal and said periodic ramp sawtooth reference signal and said constant voltage reference signal;
   wherein said controller comprising a first comparator; wherein comparing signals of said first comparator consisting of said first feedback signal and said constant voltage reference signal;
   wherein said controller further comprising a capacitor;
   wherein said controller further comprising a first switch; wherein said capacitor being discharged through turning on said first switch;
   wherein said controller further comprising a second switch; wherein said capacitor being charged through a bias current by turning on said second switch thereby generating a voltage signal on said capacitor;
   wherein said controller further comprising a second comparator configured to compare said periodic ramp sawtooth reference signal and said voltage signal on said capacitor and to generate a second comparator output signal;
   wherein a logic and driver circuit configured to directly receive said first comparator output signal and to directly receive said second comparator output signal and to generate control signals of said high-side power switch and said low-side power switch.

5. Said switching regulator in claim 4, further comprising a plurality of said switching regulator circuits; wherein said plurality of said switching regulator circuits configured to be multi-phase switching regulator.

6. Said switching regulator in claim 4 further being a switching regulator belonging to a group comprising buck, boost, buck-boost, flyback, forward and sepic switching regulator.

7. A method in a switching regulator receiving an input voltage and controlling a high-side power switch and a low-side power switch to drive a switching node for generating a switching output voltage; and said switching node being coupled to an LC filter circuit to generate a regulated output voltage on an output capacitor; said method comprising:

generating a voltage amplifier output signal;
generating a periodic ramp sawtooth reference signal at a given frequency;
wherein said periodic ramp sawtooth reference signal not being generated from said switching output voltage;
generating a first feedback signal being in phase with an inductor current; wherein said first feedback signal being generated through sensing said inductor current;
receiving said voltage amplifier output signal and said first feedback signal and said periodic ramp sawtooth reference signal;
comparing said first feedback signal and said voltage amplifier output signal through a first comparator; wherein comparing signals of said first comparator consisting of said first feedback signal and said voltage amplifier output signal; generating a voltage signal on a capacitor;
discharging said capacitor through turning on a first switch;
generating said voltage signal on said capacitor by charging said capacitor through a bias current by turning on a second switch;
comparing said periodic ramp sawtooth reference signal and said voltage signal on said capacitor through a second comparator and generating a second comparator output signal;
directly receiving said first comparator output signal and said second comparator output signal through a logic and driver circuit; and generating control signals of said high-side power switch and said low-side power switch through said logic and driver circuit.

8. Said method in claim 7, wherein said switching regulator, further comprising a plurality of said switching regulator circuits; wherein said plurality of said switching regulator circuits configured to be a multi-phase switching regulator.

9. Said method in claim 7, wherein said switching regulator being a switching regulator belonging to a group comprising buck, boost, buck-boost, flyback, forward and sepic switching regulator.

* * * * *